Figures 1, 2:
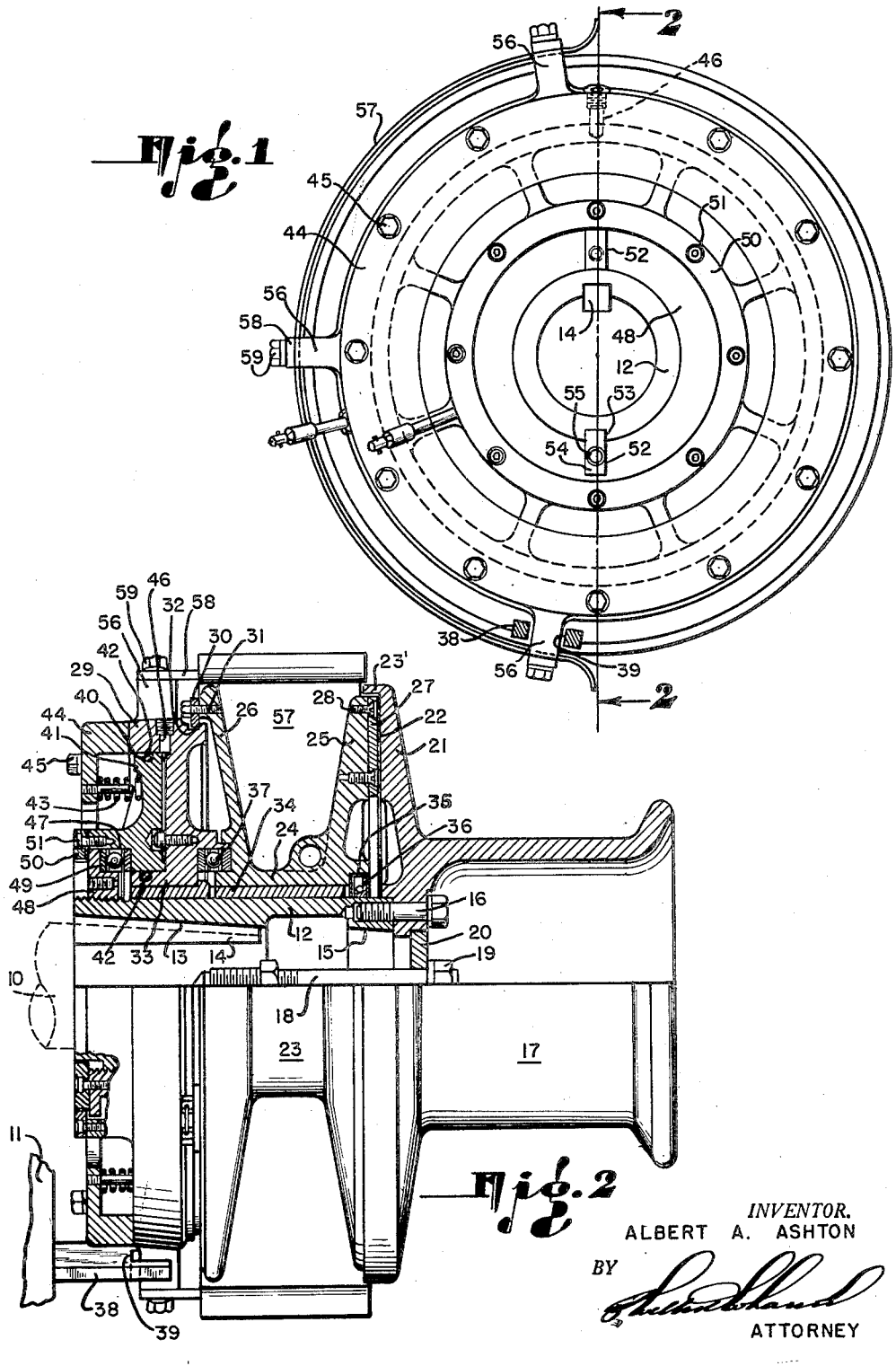

Jan. 5, 1954

A. A. ASHTON 2,665,112

DIRECT AIR FRICTION CATHEAD

Filed Oct. 29, 1949

INVENTOR.
ALBERT A. ASHTON

BY

ATTORNEY

Patented Jan. 5, 1954

2,665,112

UNITED STATES PATENT OFFICE 2,665,112

DIRECT AIR FRICTION CATHEAD

Albert A. Ashton, Houston, Tex., assignor to Emsco Manufacturing Company, Los Angeles, Calif., a corporation of California Application October 29, 1949, Serial No. 124,451

6 Claims. (Cl. 254—185)

The present invention relates generally to catheads and is more particularly concerned with improvements in friction catheads of the breakout type arranged for fluid actuation and control, such as utilized in the oil well industry.

It is an object of the herein described invention to provide a cathead of the friction type of self-contained compact construction, wherein the actuating mechanism is directly adjacent the drawworks; and which is so arranged that adjacent flanges of the breakout spool and cathead spool may be actuated into clutched and unclutched relation.

A further object is to provide in devices of such character, improved breakout spool mounting, wherein the spool is supported for rotation upon a stationary bushing, so that when the spool is disconnected from associated driving means, the spool will immediately come to a stop, and no drag will be applied to the spool from other moving parts which would tend to cause creepage movements thereof.

Another object is to provide an improved cathead construction, wherein the cathead spool is readily removable to permit access to friction clutch parts for inspection or replacement.

Still another object is to provide in a friction cathead novel adjusting means for regulating and adjusting the non-engaged clearance between friction clutch faces by which power is applied to a breakout spool.

Further objectives of the invention will be brought out in the following part of the specification, wherein detailed description is for the purpose of fully disclosing the invention without placing limitations on the scope of the invention defined in the appended claims.

Referring to the drawings, which are for illustrative purposes only:

Fig. 1 is an inner end elevational view of a friction cathead embodying the features of the present invention; and Fig. 2 is a longitudinal section, taken substantially on line 2—2 of Fig. 1, parts of the device being shown in elevation.

Referring now to the drawings, the cathead of the present invention embodies a self-contained compact construction, which is adapted for mounting as a unit at one end of the cathead shaft, as indicated in dotted lines at 10, adjacent the drawworks structure, as generally indicated at 11.

For mounting the device, a tubular sleeve or mandrel 12 is provided having an internally tapered bore 13 adapted to make a press fit with the tapered end of the cat shaft and to be secured by a suitable key 14.

The sleeve 12 is arranged to project beyond the end of the cat shaft and at its outermost projecting end is provided with a thickened end rim 15 in which a plurality of circumferentially spaced stud bolts 16 are mounted, and by which a cathead spool 17 is secured at its innermost end to the sleeve or mandrel. The sleeve or mandrel with the attached cathead spool 17 is arranged to be forced onto the end of the cat shaft by means of a pull-up stud 18 connected to the shaft end and projecting axially therefrom, the outermost end of this stud being threaded to receive a nut 19 which is arranged to be tightened against a washer insert 20 mounted in the inner end of the cathead spool.

At its innermost end, the cathead spool 17 is provided with an end flange 21 having an outer annular surface 22, and a peripheral flange 23' which is outwardly deflected so as to extend past the surface 22.

Adjacently disposed to the cathead spool is a breakout spool 23 having a tubular central hub 24 connected at its ends with diverging end flanges 25 and 26, the flange 25 being adjacently disposed to the end flange 21 of the cathead spool and having secured thereto a friction ring or shoe 27, as by screws 28. The outer surface of the friction ring 27 is adapted to cooperate with the annular surface 22 for providing a clutched and unclutched connection between the cathead spool 17 and the breakout spool 23, as will hereinafter be more fully explained.

In the construction described above, it will be apparent that the flange 23' forms a shield at the periphery of flange 25 and extends over the friction ring or shoe 27. Also, that access to the friction ring or shoe 27 for inspection or replacement is readily accomplished simply by removal of the nut 19 and stud bolts 16, which permit removal of the cathead spool 17 without disturbing the associated parts of the device.

On the opposite side of the breakout spool, there is provided adjacent the flange 26 an annular frame structure 29 which is connected with the flange 26 adjacent its periphery by means of an interlocking ring 30 secured to the flange by circumferentially spaced bolts 31, the inner edge of the locking ring being positioned within a circumferentially extending groove 32 in the adjacent surface of the frame structure 29. With this arrangement, the breakout spool 23 and frame structure 29 are interconnected for relative rotational movement and unitary axial movement in opposite directions, one of these directions being such as to bring the friction ring or shoe 27 against the annular surface 22 to form a driving connection, and in an opposite direction to move the shoe to disconnected relation with respect to the surface 22.

The frame structure 29 has a central annular hub 33 which has a press fit connection with one end of a tubular bushing 34 which projects from the frame structure and is positioned between the hub 24 of the breakout spool and the sleeve 12. The hub 24 at its outermost end is provided with an end groove 35 in which there is mounted a conventional oil seal 36. At the other end of the hub 24, an anti-friction thrust bearing 37 is mounted between the adjacent parts of the breakout spool and the frame structure 29.

The frame structure 29 is retained against rotational movement by means of an anchor post 38 which is mounted on an adjacent portion of the drawworks structure 11 and has its outermost end provided with an end slot 39 for receiving a part of the frame structure therein, which thus permits movement of the frame structure 29 in axial directions. It will, therefore, be apparent that, since the frame structure 29 is retained against rotational movement, the bushing 34 is likewise non-rotatable and will thus serve as a bearing support for rotational movements of the breakout spool, and that the sleeve 12 is freely rotatable within the bushing 34. It will be apparent, therefore, that when the rotating breakout spool is disengaged from the rotating cathead spool, the breakout spool immediately comes to a stop as there are no rotating parts which will then operate to apply drag to the breakout spool such as would tend to cause creepage movements thereof.

The face of the frame structure 29 on the opposite side from that on which the breakout spool is positioned is provided with a circumferentially extending groove 40 which forms an annular cylinder within which there is operatively positioned a ring-shaped piston 41 for relative axial movements with respect to the frame structure 29. The inner and outer peripheries of the piston are sealed with respect to the associated walls of the cylinder by O-rings 42—42 associated in appropriate grooves.

The frame structure 29 is urged in a direction to bottom the piston 41 in the cylinder by means of a plurality of coiled springs 43, circumferentially spaced around and supported by a ring bracket 44 secured to the frame structure 29 by a plurality of mounting bolts 45. Fluid for actuating the cylinder-piston is admitted through a supply passage 46 which is threaded for connection with a suitable supply conduit.

The inner periphery of the piston 41 is provided with an annular end groove 47 adapted to receive a peripheral margin of an adjusting nut 48 having threaded engagement with the adjacent end of the sleeve 12. An anti-friction thrust bearing 49 is interposed between the nut 48 and the adjacent portion of the piston 41, a retaining ring 50 being secured by bolts 51 to the piston so as to permit relative rotational movement between the nut 48 and the piston, but axially moves the piston in response to changes in the axial position of the nut 48 on the threaded end of sleeve 12. Thus, the nut 48 constitutes adjusting means by which the piston 41, frame structure 29 and connected breakout spool 23 may be axially shifted with respect to sleeve 12 as a unitary assembly, so as to vary the disengaged clearance between the face of friction ring 27 and annular surface 22. Means are provided for locking the adjusting nut 48 with respect to the associated sleeve 12. For such purpose, the outer end of the nut is provided with diametrically opposed end grooves 52, and the sleeve with a notch 53 such that when one of the grooves 52 is aligned with a notch 53, a locking key 54 may be positioned therein and held against removal by a suitable cap screw 55.

The frame structure 29 is provided with radially extending arms 56 in a portion of its periphery, which serve as supports for an arcuate guard member 57 attached to transversely extending bars 58 which are in each case connected at one end by securing bolts 59 to one of the arms 56. It will be noted that the lowermost arm 56 is disposed within the end slot 39 of the anchor post so as to retain the frame structure 29 against rotation, as previously mentioned.

From the foregoing description, it will be apparent that the invention provides a self-contained compact air friction cathead construction having a novel bushing support for the breakout spool, which incorporates an air actuating mechanism directly adjacent the drawworks; which provides novel arrangement permitting ready access to the friction ring for inspection or replacement; and wherein novel means are provided for adjusting the disengaged clearance between the friction clutch spaces.

I claim:

1. A friction cathead, comprising: a rotatable sleeve shaft extension; a cathead spool connected to the outer end of said sleeve; said spool having an inner end flange; a breakout spool surrounding said sleeve axially aligned with the cathead spool and having an outer end flange confronting said inner end flange of the cathead spool, said flanges carrying frictionally engageable surfaces; a stationary cooperatively associated annular piston and cylinder assembly surrounding the inner end portion of said sleeve; a tubular bushing surrounding said sleeve and slidably supporting said cylinder for movement longitudinally of the sleeve, said bushing having a projecting portion extending between said sleeve and breakout spool to form a bearing upon which the breakout spool is rotatable; means interlocking said cylinder and said breakout spool for relative rotational movement and unitary axial movement; means resiliently urging the piston and cylinder together to separate said frictionally engageable surfaces; and means for supplying a pressure fluid between the cylinder and piston for urging them apart to engage said frictionally engageable surfaces.

2. A friction cathead, comprising: a rotatable sleeve shaft extension; a cathead spool connected to the outer end of said sleeve; said spool having an inner end flange; a breakout spool surrounding said sleeve axially aligned with the cathead spool and having an outer end flange confronting said inner end flange of the cathead spool, said flanges carrying frictionally engageable surfaces; a stationary cooperatively associated annular piston and cylinder assembly surrounding the inner end portion of said sleeve; a tubular bushing surrounding said sleeve and slidably supporting said cylinder for axial movement longitudinally of the sleeve, said bushing having a projecting portion extending between said sleeve and breakout spool to form a bearing upon which the breakout spool is rotatable; means interlocking said cylinder and said breakout spool for relative rotational movement and unitary axial movement; means resiliently urging the piston and cylinder together to separate said frictionally engageable surfaces; means for supplying a pressure fluid between the cylinder and piston for urging them apart to engage said frictionally engageable surfaces; and a nut threaded on the inner end of said sleeve for adjustably positioning said piston and cylinder assembly axially of said sleeve to vary the disengaged clearance between the frictionally engageable surfaces.

3. A friction cathead, comprising: a rotatable sleeve shaft extension; a cathead spool connected to the outer end of said sleeve, said spool having an inner end flange; a breakout spool surrounding said sleeve axially aligned with the cathead spool and having an outer end flange confronting said inner end flange of the cathead spool, said flanges carrying frictionally engageable surfaces; a cooperatively associated annular piston and cylinder parts assembly surrounding the inner end portion of said sleeve; means engaging a part of said assembly so as to prevent rotary movement thereof; a tubular bushing surrounding said sleeve and slidably supporting one of said parts for movement longitudinally of the sleeve, said bushing being connected to said one of said parts so that it will not rotate and having a projecting portion extending between said sleeve and breakout spool to form a bearing upon which the breakout spool is rotatable; means interlocking said one of said parts and said breakout spool for relative rotational movement and unitary axial movement; means resiliently urging the piston and cylinder parts together to separate said frictionally engageable surfaces; means for supplying a pressure fluid between the cylinder and piston parts for urging them apart to engage said frictionally engageable surfaces; and means operative to adjust said cylinder and piston parts assembly axially of said sleeve to vary the disengaged clearance between the frictionally engageable surfaces.

4. A friction cathead, comprising: a rotatable sleeve shaft extension; an outwardly faced abutment near the inner end of said sleeve; a cathead spool connected to the outer end of said sleeve, said spool having an inner end flange; a breakout spool surrounding said sleeve axially aligned with the cathead spool and having an outer end flange confronting said inner end flange of the cathead spool, said flanges carrying frictionally engageable surfaces; a cooperatively associated annular piston and cylinder parts assembly surrounding the inner end portion of said sleeve between said abutment and said breakout spool; means engaging a part of said assembly so as to prevent rotary movement thereof; a tubular bushing surrounding said sleeve and slidably supporting one of said parts for movement longitudinally of the sleeve, said bushing being connected to said one of said parts so that it will not rotate and having a projecting portion extending between said sleeve and breakout spool to form a bearing upon which the breakout spool is rotatable; resilient means acting to separate said spools so as to separate said frictionally engaging surfaces; means for supplying a pressure fluid between the cylinder and piston parts for urging them apart to engage said frictionally engageable surfaces; and means operative to adjust said abutment axially of said sleeve so as to change the position of said cylinder and piston parts assembly and thereby vary the disengaged clearance of the frictionally engageable surfaces.

5. A friction cathead, comprising: a rotatable sleeve shaft extension; a cathead spool connected to the outer end of said sleeve, said spool having an inner end flange; a breakout spool surrounding said sleeve axially aligned with the cathead spool and having an outer end flange confronting said inner end flange of the cathead spool, said flanges carrying frictionally engageable surfaces; a non-rotatable bushing surrounding and axially relatively movable on said sleeve adapted to rotatably support said breakout spool; resilient means acting to separate said spools so as to separate said frictionally engaging surfaces; and fluid actuating means arranged to axially move said bushing and said breakout spool to engage said frictionally engageable surfaces.

6. A friction cathead, comprising: a rotatable cathead spool; a breakout spool axially aligned with the cathead spool, said spools having end flanges in confronting relation; a non-rotatable, axially movable bushing rotatably supporting said breakout spool; a friction surface carried by one of said flanges for frictionally engaging the surface on the other flange; a rotatable member connected to said cathead spool and extending through said bushing; an axially adjustable ring member surrounding said rotatable member; and a non-rotatable fluid actuating means operative between said adjustable ring member and said bushing and said breakout spool to cause relative movements of the spools in axial direction.

ALBERT A. ASHTON.

References Cited in the file of this patent

UNITED STATES PATENTS

| Number | Name | Date |
|---|---|---|
| 1,864,126 | Ferris | June 21, 1932 |
| 2,062,705 | Foster | Dec. 1, 1936 |
| 2,189,373 | Steel | Feb. 6, 1940 |
| 2,328,133 | Foster | Aug. 31, 1943 |

FOREIGN PATENTS

| Number | Country | Date |
|---|---|---|
| 17,167 | Great Britain | of 1911 |